United States Patent [19]

Jacobson

[11] Patent Number: 4,597,787
[45] Date of Patent: Jul. 1, 1986

[54] MANUFACTURE OF OPTICAL FIBRE PREFORMS

[75] Inventor: Amnon Jacobson, Tel-Aviv, Israel

[73] Assignee: Ispra Fibroptics Industries Herzlia Ltd., Israel

[21] Appl. No.: 670,169

[22] Filed: Nov. 13, 1984

[51] Int. Cl.⁴ ............... C03B 37/014; C03B 37/018
[52] U.S. Cl. .................................. 65/3.12; 65/18.2; 427/163
[58] Field of Search ............... 65/3.11, 3.12, 17, 18.2; 427/163

[56] References Cited

U.S. PATENT DOCUMENTS 3,971,645 7/1976 Bachmann ..................... 65/3.12
4,039,607 8/1977 Miller ........................ 65/3.11 X

FOREIGN PATENT DOCUMENTS 2447353 4/1976 Fed. Rep. of Germany ....... 65/3.12
2637937 3/1978 Fed. Rep. of Germany ....... 65/3.12
2490211 3/1982 France ..................... 65/3.11
1598760 9/1981 United Kingdom .............. 65/3.12

Primary Examiner—Kenneth M. Schor
Attorney, Agent, or Firm—Steinberg & Raskin

[57] ABSTRACT

Manufacture of optical fibre preforms. A material such as Si, Ge and $B_2O_3$ is evaporated in vacuo into a silica tube and is made to condense therein as a viscous liquid which is then oxidized. The operation may be repeated several times with different materials. In this way the tube is clad from within in such a way that the optical index of refraction increases from the periphery inwards. Upon completion of the cladding the tube is collapsed into a rod which is then used for drawing optical fibres.

9 Claims, 3 Drawing Figures

MANUFACTURE OF OPTICAL FIBRE PREFORMS

FIELD OF THE INVENTION

The invention is concerned with the manufacture of so-called optical fibres also known as optical waveguides which are used as transmission lines in data communication transmissions and systems. Such fibres may have a radially varying composition such that the refractive index increases in a continuous or stepped manner from the periphery to the core.

DESCRIPTION OF THE PRIOR ART

Optical fibres may be produced from so-called preforms e.g. in apparatus known in the art as "drawing tower" in which the preform is heated to the softening temperature and a fibre is drawn therefrom. By way of example, a preform having a usable length of 75 cm and a diameter of about 16 mm may be drawn into a continuous fibre of 8 to 10 km length.

By one known process, the so-called inside process preforms are made from high purity silica tubes serving as starting members by depositing on the inner surface thereof successive light transmitting layers of varying compositions such that in the end product the index of refraction increases from the periphery inwards. After the said deposition operation, the tube is caused to collapse into a cylindrical rod.

Thus it is known to produce preforms having a cladding of fused silica and a core of doped fused silica (see for example U.S. Pat. No. 3,619,915 assigned to Corning Glass Works). According to a known process for making such preforms pure silica particles are formed into a continuous transparent phase by a high temperature fusion operation, the required temperature being close to the softening point of pure silica, i.e. about 1600° to 1700° C. Where the fusion takes place inside the silica tube, the latter is likely to deform in consequence of such high temperatures.

By another known method a transparent silica layer is deposited on the inner face of a suitable silica tube by means of a heterogeneous chemical vapor deposition (CVD) operation using plasma activated by radio frequency or a microwave cavity to provide the necessary energy. The reaction takes place on the inner face of the tube and a solid transparent layer is formed instantaneously. The tube wall is kept at a temperature of 800° to 1200° C. in order to ensure the desired quality of the deposited silica layer. This process is expensive and cumbersome.

Two typical methods for the production of optical fibre preforms are described in U.S. Pat. No. 3,823,995 (Corning Glass Works) and U.S. Pat. No. 4,217,027 (Bell Telephone Laboratories Inc.).

The said Corning patent describes a method of forming an optical fibre preform comprising applying to a substantially cylindrical tubular starting member having a smooth inside surface a plurality of distinct and successive layers of particulate material, each of which has a different composition from the preceding layer so as to form a structure having a stepped, radially varying composition. The tubular product obtained in this way is then collapsed into a rod and the latter is subjected to a fibre drawing operation. For the deposition of the individual layers a number of techniques are mentioned such as radio frequency sputtering, deposition of soot by the flame hydrolysis method which is then sintered, chemical vapor deposition (CVD) and deposition of a glass frit. All these methods involve by definition fusing of pure silica particles or slightly doped silica particles in order to obtain continous transparent layers, fusion temperatures of 1600° C. or even higher being required. Because of the high temperatures required to consolidate pure silica particles, the practical performance of the CVD method in the manner described in the Corning patent is difficult and cumbersome because under such high temperatures the tube is liable to deform, especially if deposition is effected inside the tube, and special means and precautions have to be applied to avoid deformation.

The Bell patent discloses a specific technique referred to in the art as modified chemical vapor deposition (MCVD). According to that method a moving stream of a vapor mixture including at least one compound that is a glass-forming precursor and an oxidizing medium is introduced into a silica tube while heating the tube so as to react the said mixture and produce glassy particles in the gas phase which form a deposit on the inner surface of the tube, the heating of the tube and the contents being effected by a moving hot zone produced by a correspondingly moving heat source external to the tube, combustion within the tube being avoided and the temperature within the hot zone, the composition of vapor mixture and the rate of introduction of the vapor mixture being maintained at values such that at least a part of the reaction takes place within the gaseous mixture at a position spaced from the inner walls of the tube thereby producing a suspension of oxidic reaction product particulate material, whereby the particulate material while travelling downstream comes to rest on the inner surface of the tube. Here again the temperature required for the fusion of the particulate material prevailing near the inner surface of the tube is of the order of 1600° C. or higher, and the final multi-layer product has to be collapsed into a rod which is then drawn into an optical fibre. Similar as in the Corning process also in the MCVD process it is difficult to form inside the tube a transparent pure silica layer because of the high temperatures required.

A common feature to all prior art products and processes for the production of an optical fibre preform by fusion of particulate silica is the operation at an elevated temperature of about 1600° C. or even higher, such temperatures being required in order to achieve vitrification of the initial particulate material deposited on the inner wall of the tube so as to form a continuous homogenous transparent silica glass layer. However such a high temperature may produce initial viscous deformation in the glass tube which is a substantial cause for geometrical instability during the collapse of the tube into a rod, resulting in an eliptical cross-section of the preform and consequently also of the fibre drawn therefrom, which seriously damages the signal transmission capabilities of the fibre.

Moreover, in known processes such as the Corning and Bell processes the deposition efficiency is quite low and for some silica dopant such as Ge may be as low as 10% which is due mainly to undeposited vaporous react products which escape with the residual gases leaving the tube. Also the said Corning and Bel processes as well as other CVD processes activated by plasma or otherwise were conceived at a time when it was quite difficult to obtain high purity materials, and therefore it was advantageous to use methods such as CVD or MCVD which result in very pure reaction products.

Nowadays in view of the fast growing need for high purity electronic grade materials, such materials are readily available and can be used directly for the production of optical fibre preforms.

SUMMARY OF THE INVENTION

It is an object of the present invention to provide a process for the production of optical fibre preforms using a commercially available silica tube as starting member and conducting the deposition in such a way and at such temperatures that the tube is not deformed during the deposition operation. It is another object of the invention to devise the production of optical fibre preforms in such a way as to avoid the intermediary formation of particulate material, e.g. particulate silica, and thereby to avoid fusion of particulate material. It is a further object of the present invention to provide a process as specified with a higher deposition efficiency than in accordance with the prior art.

In accordance with the invention there is provided a process for the production of an optical fibre preform comprising depositing on the inner surface of a silica tube at least one layer of material that is transparent to the light to be guided by the optical fibre to be drawn from the preform such that the index of refraction increases from the periphery towards the interior, and upon completion of the deposition collapsing the tube into a rod, characterised by a cycle of operations comprising:

(i) establishing a system comprising said tube and at one end thereof (feed end) a vessel with at least one chamber holding material to be deposited on the inner wall of the tube, said material being characterised in that under the operative pressure and temperature the transition from the gaseous to the solid phase leads through the liquid phase;

(ii) establishing inside said system a reduced pressure within the range of $10^{-8}$ to $10^3$ microns Hg;

(iii) heating said system to a temperature of 900° to 1500° C. thereby to cause evaporation of said material from said chamber to the tube, the vacuum inside the system being so controlled that evaporation occurs at a temperature at which the tube does not deform in any appreciable manner;

(iv) creating a cooler zone inside said tube by external cooling which cooler zone is moved in uniform axial motion from the far (exhaust) end of the tube towards the feed end thereof thereby to cause deposition of the evaporated material by condensation as a viscous liquid layer on the inner surface of the tube; and (v) causing said viscous layer to solidify.

Where the deposited material is in an oxidizable form, e.g. elemental silicon, germanium and the like, the invention further provides that upon completion of said deposition pure oxygen is continuously flown through the system in the direction from the feed end towards the exhaust end thereof thereby to cause oxidation of said deposited layer.

Evaporation of the material inside said chamber may be enhanced by supplying additional nonthermal energy such as electron beams, RF microwaves, etc. Such additional energy is not absorbed by the silica tube and where the material to be evaporated is, for example, a metal such as Si or Ge, it is taken up by the metal whereby the rate of evaporation is significantly increased.

The materials used in the new process for the manufacture of optical fibre preforms in accordance with the invention have all the common feature that within the specified vacuum range their melting temperature is lower than their evaporation temperature, the latter being less than 1500° C.

Inside the cooler zone the temperature is selected to be below the boiling point and in consequence the evaporated hot gases are condensed as liquid layers on the selected cooler zone of the inside face of the silica tube. The formation of such a characteristic liquid layer is substantially different from known processes in which a particulate material is deposited in the tube.

Thus in accordance with the invention the evaporation of the material to be deposited and deposition thereof inside the tube are physical phenomena which proceed essentially without any chemical reaction in the vapor phase. The new method for manufacture of optical fibre preforms and consequently also the manufacture of the optical fibres themselves is accordingly fundamentally distinguished from the known CVD and MCVD or plasma CVD methods in which the deposition occurs concurrently with a chemical reaction in the vapor phase. Accordingly the new method according to the invention will be referred to hereinafter as physical vapor deposition (PVD) as opposed to the prior art chemical vapor deposition (CVD) and modified chemical vapor deposition (MCVD). Further details on physical vapor deposition processes are given in "Vapor Deposition" by Powell, Oxley and Blecher, 1966 and "Handbook of Thin Film Technology" by Maissel and Glang, 1970 (McGraw Hill Book Co., Inc.).

In practice the chamber or chambers will also be of silica and preferably a vessel holding one or several such chambers is fused together with the silica tube into one continuous system. The tube itself may, for example, have an outside diameter of up to 40 mm and a thickness to outside diameter ratio of from 1:20 to 1:4.

The material for deposition to be placed inside said chamber or chambers will as a rule be solid and may for example be in the form of a powder or filament and be placed into the chambers either directly or by means of a carrier vessel such as, for example, a carrying boat.

During operation the tube-chamber system is preferably rotated continuously about its longitudinal axis at a uniform speed of revolution ranging, for example, from 10 to 200 rpm.

Where in accordance with the invention it is desired to produce a multi-layer preform comprising two or more different layers, it is possible to repeat the operation several times, each time with a different material. It is also possible to make a closed system with two or more chambers, to load into each of them a different material such that the one with the lowest boiling point will be closest to the tube and the one with the highest boiling point will be furthest away from the tube. The operation will then be repeated in cycles, the operational temperatures being raised and/or the operational pressure being further reduced from one cycle to the next.

Where evaporation of the material is enhanced by auxiliary means such as RF, microwaves an electron beam etc. as specified, the source of such additional energy may be in the form of a ring surrounding the tube. Initially the ring is placed around the chamber holding the material to be evaporated so as to enhance evaporation and then the ring may be moved several times back and forth along the tube so as to facilitate even distribution of the vapour inside the tube prior to condensation.

In accordance with one embodiment of the invention the material to be evaporated is introduced into the tube in form of a filament and is spun in axial direction inside tube in the chamber between vacuum-tight terminals so as to be connectable outside the chamber to an electric current supply. When electric current is passed through the filament the rate of evaporation is increased.

Due to the fact that in accordance with the invention the entire operation is conducted in a sealed system under reduced pressure the evaporation temperature becomes sufficiently low so as not to deform the tube and the deposition efficiency in each layer is close to 100%, as opposed to much higher reaction temperatures and considerably lower deposition efficiencies—occasionally as low as 10%—in the CVD and MCVD method.

In addition to oxygen it is also possible, if desired, to pass other gases through the system after the deposition of said liquid viscous layer, either prior to or after the flow of oxygen. Examples of such gases are fluorine and chlorine and they may serve to create by chemical reaction dopants or getters inside the deposited layers.

Examples of materials that can be deposited as liquid layer condensate by the PVD method according to the invention are pure metals of Si and Ge and combinations thereof. These materials are oxidized after being deposited. Examples of oxides that can be deposited by the PVD method are $B_2O_3$. The melting point and various boiling points in vacuo of these materials are shown in Table "A" together with the evaporation rate equation.

TABLE "A"

| Material | M.P. °C. | Equilibrium Pressure P* in microns Hg (column heads) B.P. °C. (columns) | | | | | | | |
|---|---|---|---|---|---|---|---|---|---|
| | | 40 | 30 | 20 | 10 | 5 | 0.7 | 0.5 | 0.4 |
| Si (Ref 1) | 1410 | 1430 | 1410 | | | | | | |
| Si (Ref 1) | | | | | | 1580 | 1450 | 1430 | 1415 |
| Ge (Ref 2) | 937 | 1530 | 1505 | 1460 | 1430 | | | | |
| Ge (Ref 2) | | | | 1440 | 1410 | | | | |
| $B_2O_3$ (Ref 1) | 460 | 1270 | 1255 | | | | | | |

Ref 1 = "Balzers" Catalogue "Coating Materials" 84/86 (published by Balzers A.G., Lichtenstein)
Ref 2 = "Handbook of Thin Film Technology" by Maissel and Glang (1970), McGraw Hill Book Co., Inc.
The evaporation rate equation is (Ref 2)
$$\frac{dN_e}{A_e dt} = (2\pi m kT)^{\frac{1}{2}} (P^* - P)$$

$dN_e$ = number of molecules having an individual mass m evaporating from surface area $A_e$ during time dt at temperature $T(°k)$ at which the equilibrium pressure is $P^*$, under vacuum P (k is the Bolzman coefficient).

BRIEF DESCRIPTION OF THE DRAWINGS

The invention will now be described with reference to the annexed drawings in which.

DESCRIPTION OF PREFERRED EMBODIMENTS

Figure 1:
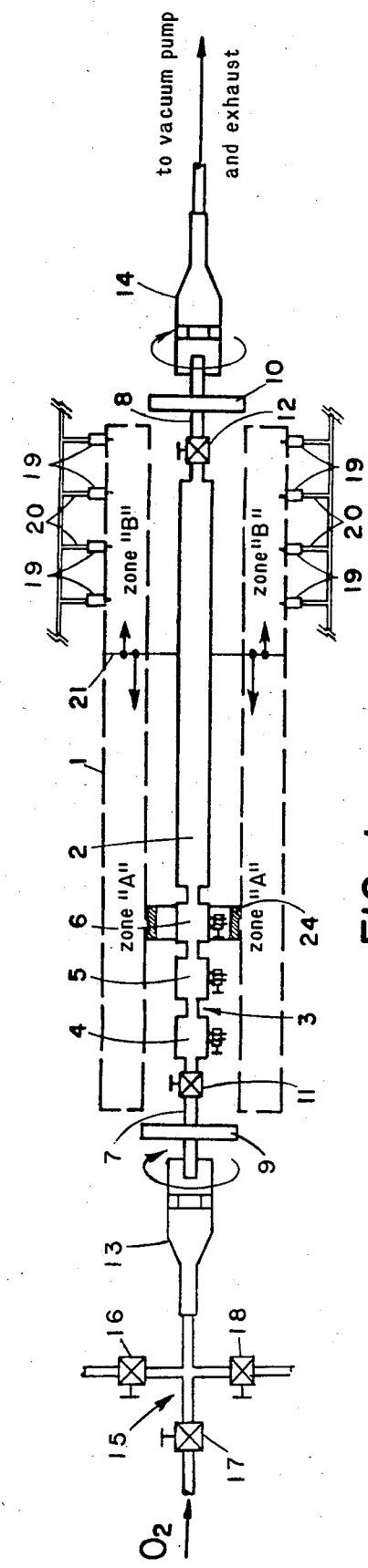
FIG. 1 is a diagrammatic elevation of an apparatus for carrying out the method according to the invention.

The apparatus shown in FIG. 1 comprises an oblong furnace 1 within which is located a silica tube 2 having fused to its feed end a vessel 3 comprising three aligned chambers 4, 5 and 6, each chamber having a valved control inlet for charging the material to be evaporated. The assembly 2,3 is fitted at both ends with tubular extensions 7 and 8 having mounted thereon pulleys 9 and 10 for connection by mechanical means such as belts (not shown) to a driving motor (not shown) whereby the assembly 2,3 is rotatable about its longitudinal axis. Near the feed and exhaust ends of assembly 2,3 there are provided control valves 11 and 12, respectively.

At their ends the tubular extensions 7 and 8 are connected to links 13 and 14, respectively, each of which is so designed that while the assembly 2,3 rotates the connector remains static. The other end of connector member 13 is connected to a manifold 15 fitted with control valves 16, 17 and 18 and serving for the supply of gases. The exhaust side of connector member 14 leads to a vacuum pump and exhaust.

Furnace 1 is fitted with a plurality of nipples 19 (only some of which are shown), each nipple 19 being connected via a hose 20 to a supply of cold gas which is adapted for injection of cold gas into the furnace. All nipples may be automatically opened in a predetermined sequence and rate by programmed control means as known per se (not shown).

The apparatus further comprises an annular source of non-thermal energy 24, e.g. a resonator adapted (in a manner not shown) to travel back and forth along the assembly 2,3.

The PVD operation with an apparatus according to FIG. 1 proceeds as follows:

Assuming that it is desired to produce two layers, a first layer of pure silica and a second one of silica doped with germania ($GeO_2$) which serves to increase the refractive index, a silicon powder is introduced into chamber 6, valve 11 is sealed while valve 12 remains open and a desired vacuum is applied e.g. of the order of 0.4 micron Hg. The temperature of furnace 1 is set at 1450° C. whereupon the Si boils and evaporates into the silica tube 2.

Optionally additional, non-thermal energy may be introduced by means of resonator 24 whereby while it is positioned around the evaporation chamber, the rate of evaporation is increased. Upon completion of the evaporation and prior to cooling (see below) the annular resonator 24 may be moved back and forth along tube 2 in order to facilitate even distribution of vapour inside the tube.

In FIG. 1, furnace 1 is shown to have two zones A and B, zone A being the hot zone and zone B the cooler zone. The temperature inside zone B is reduced by the injection of a cooling gas via hoses 20 and nipples 19. At the beginning of the operation the length L of zone B is 0 and a short while after the beginning of the boiling of silica silicon inside chamber 6, cooling gas is successively injected into the various nipples 19 beginning with the rightmost one and gradually progressing from right to left (with reference to FIG. 1). In this way the interface 21 between the hot zone A and the cooler zone B moves gradually and in uniform motion from right to left so that the length L of zone B increases while the length of zone A gradually diminishes and the evaporation of silicon from chamber 6 the interface 21 has reached that chamber. In the particular case of silicon the cooling operation is so controlled that the temperature prevailing inside zone B around the tube 2 is 1415°

C. At this temperature pure silicon condenses on the inner side of tube 2 in the form of a viscous liquid.

Upon termination of liquid silicon deposition on the inner side of tube 2 valves 17 and 11 are opened and pure oxygen is flown passed through the system 2,3 whereby the silicon is oxidized into silica $SiO_2$ In a second stage germanium powder is introduced into chamber 5 and the operation is repeated, valves 17 and 11 being shut, the pressure inside the system 2,3 being now set at 10 microns Hg. The $GeO_2$ that forms upon oxidation of the initially deposited germanium diffuses partly into the $SiO_2$ substrate and the duration and temperatures of operation may be so controlled that in the end result there form two layers 22 and 23, the former being of pure $SiO_2$ and the latter of $SiO_2$ doped with $GeO_2$. Alternatively it is possible to conduct the process in such a way that the $GeO_2$ diffuses homogenously into the entire $SiO_2$ layer to form a uniform $GeO_2$ doped $SiO_2$ layer.

Inlets 16 and 18 of manifold 15 serve for the optional introduction of other gases. Thus for example, chlorine may be injected through valves 16 at the beginning of the operation for the complete dehydration of tube 2. Where this is not practical because of the corrosive effect of chlorine, nitrogen may be used instead.

Valve 18 may serve for the introduction of fluorine, to produce in situ silicon fluoride as dopant of the cladding layer, in order to obtain, if desired a layer with a refractive index smaller than that of undoped silica.

Figure 2:
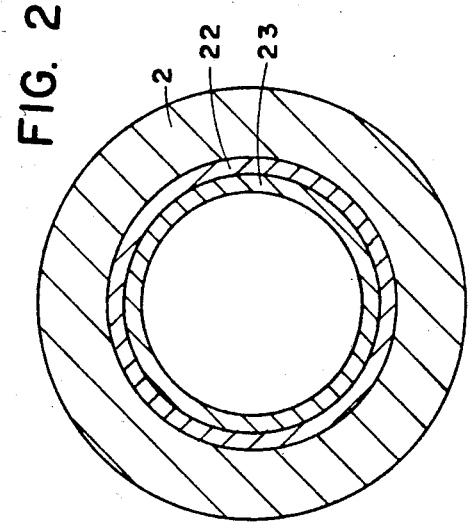
FIG. 2 is a cross-section through a hollow silica tube with inner deposits according to the invention.
Figure 3:
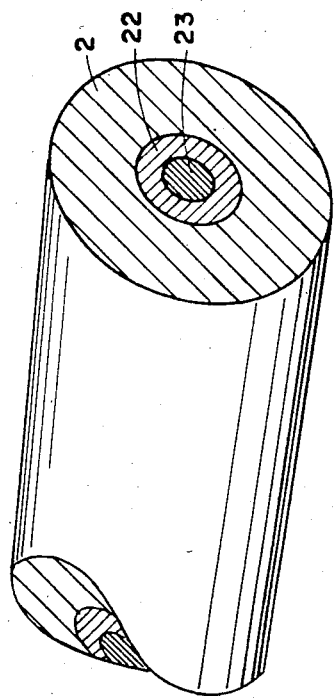
FIG. 3 is a fragment of a collapsed preform rod made from a hollow tube according to FIG. 2.

The two cladding layers produced by the two-stage cladding operation described above are shown in FIG. 2. At the end of the cladding operation the furnace 1 is removed from the system 2,3 and tube 2 is severed from vessel 3 and is then collapsed in a manner known per se to produce a rod as shown in FIG. 3.

The invention is further illustrated by the following examples. In these Examples all indications of rates of layer formation are theoretical averages.

EXAMPLE 1

An apparatus was used as in FIG. 1 comprising three chambers. Chamber 6 was charged with 14 gr of pure fine Si powder (average particle diameter 40 microns), having properties as shown in Table "A" (Ref. 2) The silica tube was 1 meter long, the outer diameter was 25 mm and the wall 3 mm. The furnace temperature was maintained at 1450° C. (P*=0.7 microns Hg). The sealed system was evacuated to a vacuum of 0.4 micron Hg and revolved at a speed of 60 rpm. The gas cooling device was set to create a cool zone "B" having a temperature of 1410° C. or less, the front of which moved towards chamber 6 at a speed of 2 cm/min. A silicon layer was condensed on the inner wall of the tube in zone "B" at the rate of about 100 microns/h along the tube and at the end of one hour of evaporation a layer of pure silicon of 0.1 mm had formed. The oxidation into silica was performed by introducing pure oxygen gas at a rate of 0.5 lit/min at 1100° C. Oxidation was completed after 15 min. A 100 microns thick layer of pure clear silica resulted along the tube.

EXAMPLE 2

The product tube of Example 1 was used for further cladding. 1 gr of pure Germanium powder (average particle diameter=80 $\mu$ and having properties as in Table "A" (Ref. 2)) was charged into chamber 5 and the process described in Example 1 was repeated, setting the vacuum at 10 microns Hg and maintaining the furnace temperature at 1440° C., P* being 20 microns Hg. The process rates were as in Example 1, except that the rate of travelling of zone "B" was 18 cm/min, and in this way a 7 micron thick liquid Ge layer was initially obtained along the tube which was then converted into $GeO_2$ by oxidation conducted similar as in Example 1.

During oxidation, the $GeO_2$ was diffused into the deposited $SiO_2$ layer, resulting in an outer transparent $GeO_2$ doped $SiO_2$ layer with a higher index of refraction in comparison to the underlying pure silica layer.

EXAMPLE 3

In a first cycle the process was conducted as in Example 1 followed by a second cycle as in Example 2 using, however, only 0.1 gr of Ge and the process rates were changed accordingly. In a third cycle Example 1 was repeated with parameters adjusted for a 50 micron layer and in a fourth cycle Example 2, was repeated with 0.2 gr of Ge and the process rates being adjusted accordingly. Further cycles followed in a similar way to yield the desired number of layers and the amount of Ge was increased each time to obtain richer $GeO_2$ doping, thereby obtaining a so-called graded refraction index profile.

EXAMPLE 4

Codeposition of Si and Ge. 14 gr Si was charged into chamber 6 and 1 gr Ge into chamber 5. At first the vacuum was set at 10 microns Hg until all the germanium was evaporated and condensed and then at 0.4 microns Hg. whereupon Si was evaporated and condensed. There then followed oxidation and in this way a $GeO_2$ doped $SiO_2$ layer was obtained.

EXAMPLE 5

Codeposition of several layers. Si and Ge were charged into chambers 6 and 5, respectively. In order to obtain grading of the refraction index evaporation was started at a lower vacuum and temperature of zone "A" and raised gradually after each pass of zone "B" up to the upper limit of 1450° C. and 0.1 microns Hg, whereby the relative rates of evaporation of Si and Ge were changed. Each pass of the cooling zone "B" was followed by an oxidation step. In this way successive layers of varying composition and indices of refraction were formed resulting from the gradual change of the amount of $GeO_2$ in $SiO_2$ such that the indices of refraction increased gradually from the periphery towards the centre.

EXAMPLE 6

The procedure of Example 1 was repeated with, however, additional non-thermal energy supply, e.g. by means of a resonator like 24 in FIG. 1 which is operated in the manner described with reference to FIG. 1. All Si was evaporated within 5 min. The front of zone B (FIG. 1) moved at a rate of 10 cm/min. and a Si layer was formed at a rate of 10 microns/min.

I claim:
1. In a method of producing a glass preform useful for drawing optical fibres, which comprises
    forming a system comprising a glass tube having a first end operatively connected to a chamber,
    charging the chamber with solid silicon,
    effecting a reduced pressure in the system of $10^{-8}$ to $10^3$ microns Hg, heating the silicon to a temperature up to 1500° C. so as to evaporate the same while maintaining the reduced pressure in the system, whereby the glass tube is not deformed during the evaporation, externally cooling said tube from the end opposite the first end towards the first end to a temperature at which said silicon condenses as a liquid, thereby causing deposition of the silicon as a liquid layer on the inner surface of the tube from the other end to the first end, passing oxygen through said tube from the first end to the other end, thereby oxidizing the deposited silicon to silica and forming a uniform silica coating on the inner surface of the glass tube, and forming a coating of a metal oxide on said silica coating by evaporation of a metal and oxidation thereof in the same manner as with the silica, or by evaporation of a metal oxide and deposition thereof by cooling on the silica, whereby the metal oxide diffuses into the silica to dope the same.

2. Method according to claim 1 wherein the silicon and the metal or metal oxide are deposited in successive pairs of cycles of operation with the relative proportions of silica and the metal in each pair of cycles being gradually changed from one pair of cycles to the other.

3. Method according to claim 1 wherein evaporation is enhanced by supplying non-thermal energy to the system.

4. Method according to claim 1 wherein the metal or metal oxide to be evaporated is introduced into the chamber in the form of a filament that is spun inside the tube in axial direction between vacuum tight terminals; and electric current is passed through the filament to supply additional energy thereto and thus to enhance evaporation.

5. Method according to claim 1 wherein the chamber is charged sequentially with the materials for evaporation.

6. Method according to claim 1 wherein the glass tube is operatively connected to several chambers containing different materials for evaporation and wherein conditions are effected to evaporate and deposit only one material at a time.

7. Method according to claim 1 wherein the metal is germanium.

8. Method according to claim 1 wherein the metal oxide is $B_2O_3$.

9. Method according to claim 1 wherein at least a portion of the deposited silica layer is doped by passing fluorine through the system after the deposition of silicon therein.

* * * * *